United States Patent

[11] 3,569,805

| [72] | Inventor | Peter W. Hammond |
| | | Cleveland, Ohio |
| [21] | Appl. No. | 755,927 |
| [22] | Filed | Aug. 28, 1968 |
| [45] | Patented | Mar. 9, 1971 |
| [73] | Assignee | Reliance Electric Company |

[54] SYNCHRONIZING CIRCUIT
18 Claims, 14 Drawing Figs.

[52] U.S. Cl. .................................... 318/227,
307/269, 318/231, 321/9, 328/63
[51] Int. Cl. .................................... H02p 5/40
[50] Field of Search .................................. 318/227,
231; 307/269, 3; 321/9 (A); 328/63, 139;
332/(Inquired)

[56] References Cited
UNITED STATES PATENTS
| 3,406,328 | 10/1968 | Studtmann | 321/9A |
| 3,445,742 | 5/1969 | Moscardi | 321/9A |
| 3,346,794 | 10/1967 | Stemmler | 321/9A |

FOREIGN PATENTS
| 196,176 | 4/1955 | Netherlands | 321/9A |

Primary Examiner—B. Dobeck
Assistant Examiner—K. L. Crosson
Attorney—Woodling, Krost, Granger and Rust ABSTRACT: A synchronizing circuit for use especially with a pulse width modulated inverter wherein a carrier establishes the pulsed conduction periods of the inverter in accordance with a reference voltage at a lower frequency which determines the fundamental frequency at which the inverter output voltage is supplied. This voltage may be supplied to an AC motor which runs at a speed corresponding to this fundamental frequency. The inverter may energize the motor at variable frequencies for variable speed hence the reference frequency is variable and the carrier frequency may not be an integral multiple thereof. Accordingly the present circuit shows a means to synchronize the reference with the carrier twice each cycle of the reference voltage. A shortened carrier period is provided so that this shortened carrier period plus a plurality of normal carrier periods equals a synchronizing interval; namely, one-half of the reference voltage cycle. The foregoing abstract is merely a resume of one general application, is not a complete discussion of all principles of operation or applications, and is not to be construed as a limitation on the scope of the claimed subject matter.

PATENTED MAR 9 1971

INVENTOR.
PETER W. HAMMOND
BY Woodling, Krost,
Granger and Rust
ATTORNEYS.

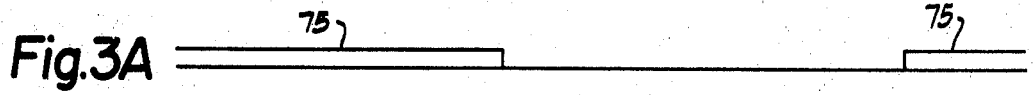
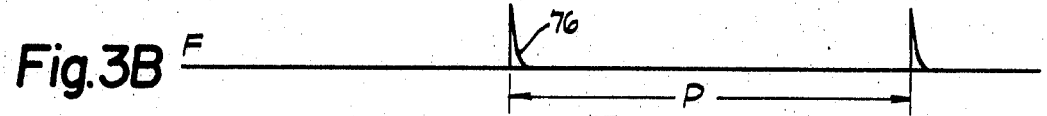
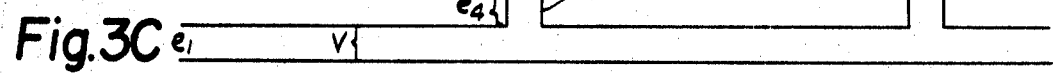
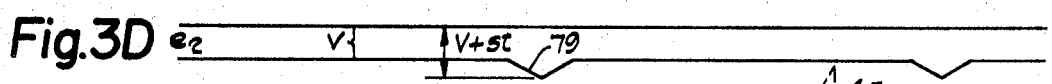
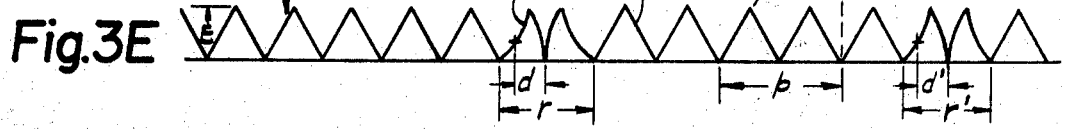
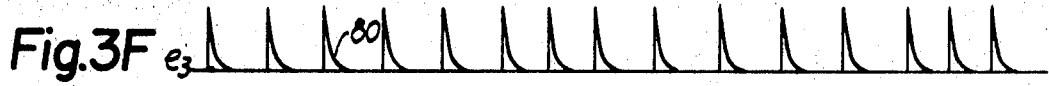
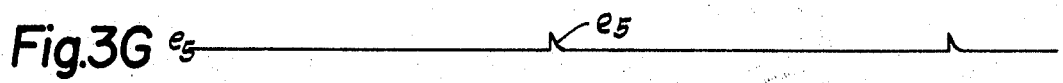
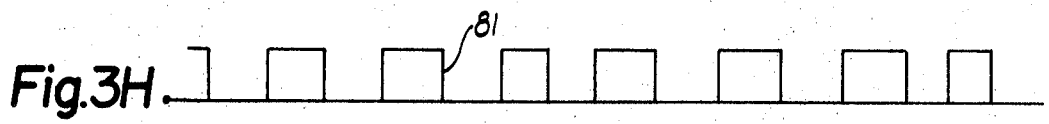
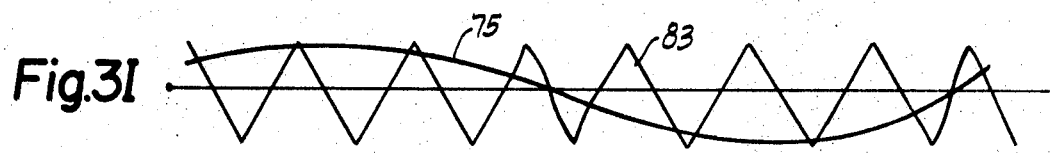
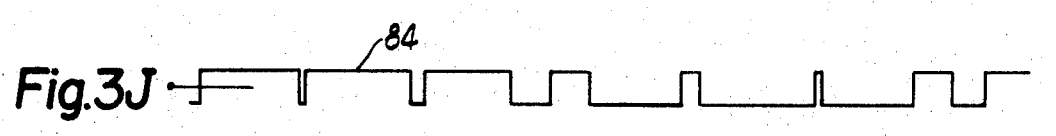

2

SYNCHRONIZING CIRCUIT

BACKGROUND OF THE INVENTION

In certain types of pulse width modulated inverter systems a switching waveform is used to turn on and off the unidirectional conducting devices such as thyristors. The switching waveform is generated by comparing a reference signal with a higher frequency carrier. One typical use of inverters is driving induction or synchronous motors, wherein the speed is dependent on the fundamental frequency of the inverter output and this inverter output frequency is varied in order to provide a ready means for variable speed of the motor. The carrier frequency establishes the repetition rate of the pulses supplied at the inverter output and the relative widths of the pulses establishes an average voltage at the reference signal frequency to establish the synchronous speed of an alternating current motor driven from the output of the inverter. As the reference frequency varies, the carrier frequency usually is not an integral multiple of the reference frequency. In such case the period of the output waveform of the inverter is the smallest time interval that is an integral multiple of both the carrier and reference periods. By way of example, if the carrier frequency were 360 Hz. and the reference frequency were 33 Hz. then the ratio of carrier frequency to reference frequency can be reduced by a factor of 3 to 120/11 but can be reduced no further. This means that 11 reference cycles, or 120 carrier cycles, would occur before the output waveform would repeat itself, yielding a period of one-third second. This implies a 3 Hz. frequency component which will adversely affect motor operation, for example by excess heating and torque pulsations on the motor shaft. To avoid this the prior art has attempted ways to synchronize the higher frequency carrier with the reference frequency at periodic intervals. One prior art way to do this was to merely chop off the remaining portion of the carrier half cycle at the end of each reference cycle or half cycle in order to start the carrier cycles over again at the beginning of each reference cycle. This did eliminate the unwanted low frequency, 3 Hz. in the above example; but introduced other problems.

A general description of this type of static frequency changer or inverter is given in the article by Schonung and Stemmler in the Brown Boveri Review for Aug./Sept. 1964, at page 555.

Accordingly an object of the invention is to provide a synchronizing circuit for an inverter which eliminates the undesired low frequency.

Another object of the invention is to provide a synchronizing circuit to periodically synchronize a carrier and a lower frequency reference voltage.

Another object of the invention is to provide a synchronizing circuit for an inverter supplying a load wherein undesired transient currents are kept from being supplied to the load.

Another object of the invention is to provide an inverter synchronizing circuit wherein a higher frequency carrier is periodically synchronized with a reference voltage by changing the frequency of the carrier for one or more cycles.

Another object of the invention is to provide a PWM inverter synchronizing circuit wherein a higher frequency carrier has the frequency thereof periodically increased in order to synchronize it with a reference voltage.

SUMMARY OF THE INVENTION

The invention may be incorporated in a synchronizing circuit for two different frequencies including means establishing a carrier frequency signal, means establishing a reference voltage of lower frequency, said reference voltage having a synchronizing interval proportional to the period thereof, there being a plurality of cycles of the carrier frequency in one synchronizing interval and the carrier frequency being other than an integral multiple of the reference voltage frequency, means for synchronizing the carrier and reference voltages once each synchronizing interval including, establishing said carrier signal as a train of repetitive cycles and each having a normal carrier period, and establishing a corrected carrier period of a time interval different from the normal carrier period by varying the carrier voltage exponentially with time to establish a corrected carrier period different from the normal carrier period.

Other objects and a fuller understanding of the invention may be had by referring to the following description and claims, taken in conjunction with the accompanying drawings.

BRIEF DESCRIPTION OF THE DRAWING

FIG. 3 is a family of voltage diagrams to explain the operation of the carrier generator and the synchronizing circuit;

DESCRIPTION OF THE PREFERRED EMBODIMENT

Figure 1:
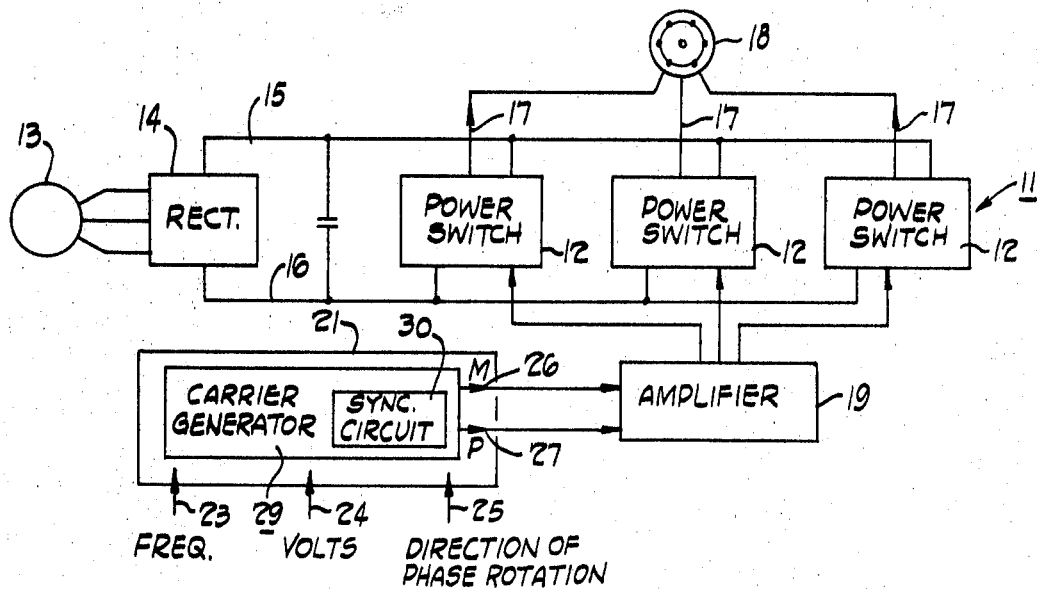
FIG. 1 is a block diagram of an inverter which may use the synchronizing circuit of the invention.

The FIGS. of the drawing illustrate a preferred embodiment of the invention however the following description is not to be taken as limiting on the invention, the invention being defined only by the hereinafter appended claims. The synchronizing circuit of the present invention has as one use thereof the synchronizing of a carrier with a lower frequency reference voltage in a pulse width modulated inverter. In certain types of these inverters a carrier is compared with a lower frequency reference and whenever the reference voltage exceeds the carrier, or it can be vice versa, the inverter output circuit is switched to its positive state, it being otherwise in its negative state. The inverter itself may take many forms and FIG. 1 shows an inverter 11 which may be used with the invention. The inverter includes a power switch 12 which may be a thyratron or in more recent inverters is usually a thyristor. The inverter 11 is powered from positive and negative buses 15 and 16, respectively, which may be energized from a three-phase alternating voltage source 13 through a rectifier 14 to supply a DC voltage to these buses. The power switches 12 are connected across these buses 15 and 16 and in a conventional inverter each power switch includes a pair of series connected thyristors with three-phase inverter output leads 17 which are connected to a load such as an AC motor 18. These thyristors have control elements or gates which are controlled in conduction by a modulator 21 acting through an amplifier 19. The modulator 21 in turn is controlled by signals supplied to a frequency input terminal 23, a voltage input terminal 24, and a direction of phase rotation input terminal 25. The frequency input terminal 23 is supplied with a signal at a desired frequency for the operation of the inverter output leads 17, and hence the desired speed of an AC motor 18, for example, connected to these leads 17. The modulator 21 also includes a carrier generator 29 which has therein a synchronizing circuit 30, a carrier magnitude output terminal 26 and a carrier polarity output terminal 27. The modulator 21 may include digital logic circuits to take this information and control the thyristors 12 for proper pulse width modulation of the inverter output at the leads 17.

Figure 2:
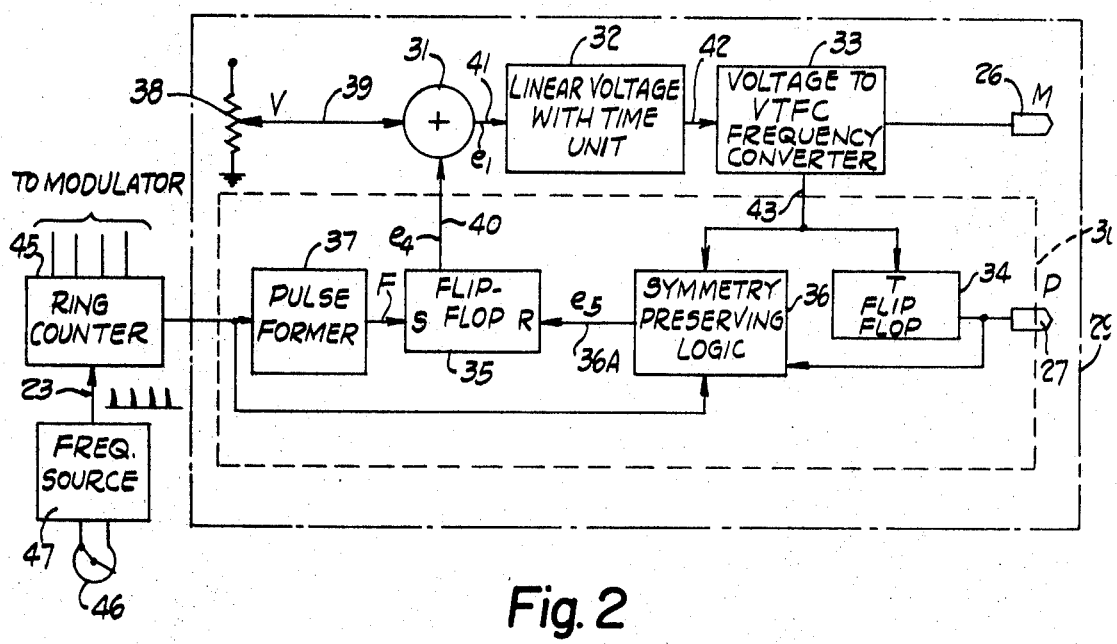
FIG. 2 is a block diagram of the carrier generator including the synchronizing circuit used with the inverter of FIG. 1.

The FIG. 1 shows one of several different pulse width modulator inverters with which the synchronizing circuit of the invention may be used. FIG. 2 shows a block diagram of the carrier generator 29 of the invention. This carrier generator includes generally a synchronizing circuit 30, a linear voltage with time unit 32, a voltage to frequency converter 33, and flip-flops 34 and 35. The carrier generator 29 also includes a potentiometer 38, supplying a DC voltage signal $V$ of variable voltage to an input 39 of a summing point or adder 31. The summing point 31 has another input 40 from the flip-flop 35. The summing point 31 has an output 41 to the linear voltage with time unit 32. This unit has an output 42 which is supplied to the voltage to frequency converter 33. This converter in turn has an output to the carrier magnitude output terminal 26 of the modulator 21, FIG. 1. The converter 33 also has another output 43 fed to the flip-flop 34 and to a symmetry preserving logic circuit 36. The flip-flop 34 has an output to the carrier polarity terminal 27 of the modulator 21, FIG. 1, and to the logic circuit 36. Logic circuit 36 has an output 36A to the flip-flop 35. The flip-flop 35 has the output 40 to the summing point 31 and also has an indirect input from terminal 23 via a pulse former 37, which terminal 23 is the reference frequency input. This reference frequency at terminal 23 may be obtained in various ways and the illustrated way is a ring counter 45 which has a variable output frequency determined by the setting of the speed control potentiometer 46 controlling a variable frequency source 47. Merely by way of example this speed control potentiometer 46 may be adjusted so that the ring counter 45 has an output frequency of 33 Hz. This would establish a fundamental output frequency on the inverter output leads 17 of 33 Hz., which output is made up of discrete pulses of variable width, the pulses being established at a repetition rate of the carrier frequency so that the motor 18 will run at a speed corresponding to 33 Hz.

Figure 4:
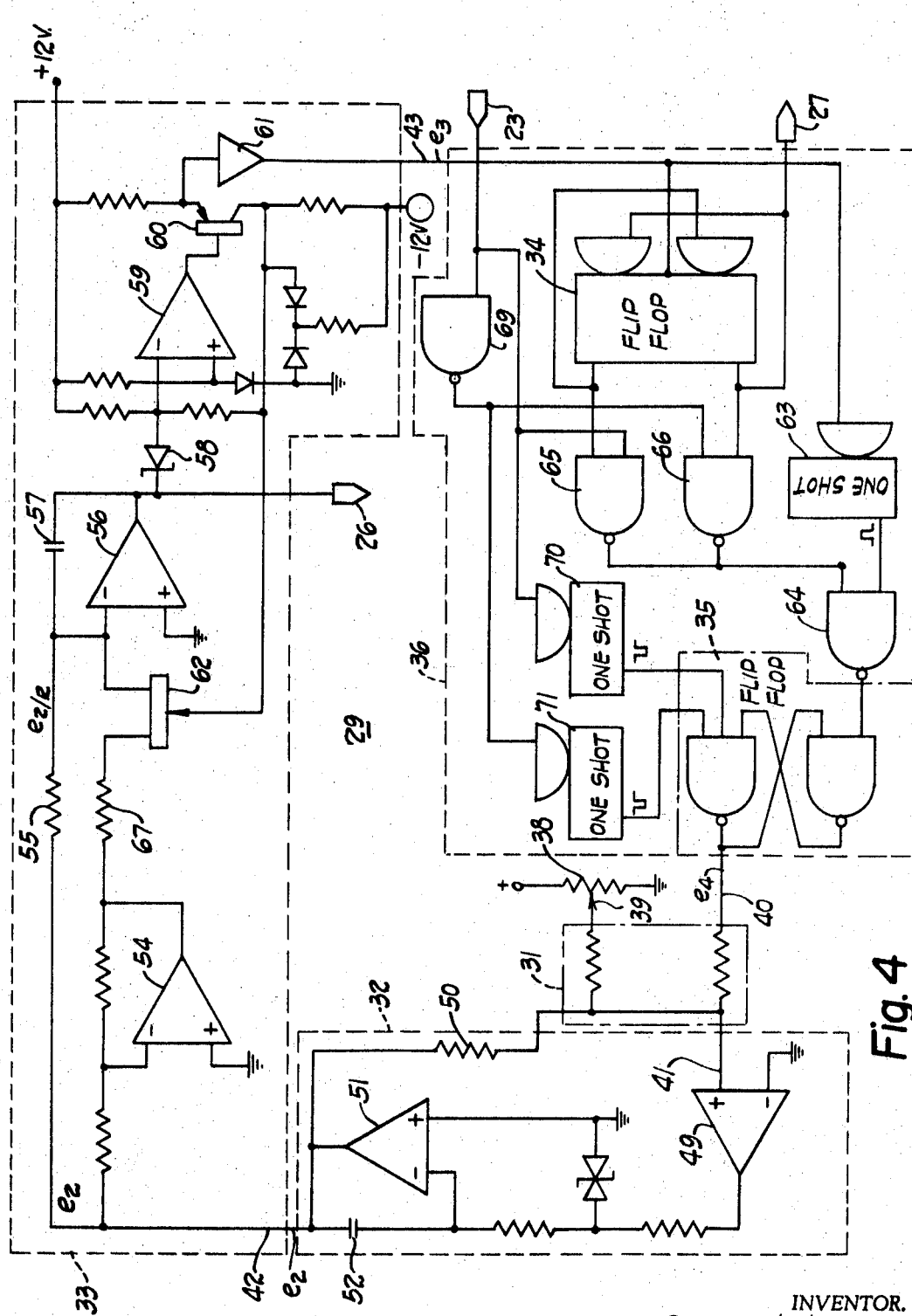
FIG. 4 is a more complete schematic diagram of the carrier generator and synchronizing circuit generally shown in FIG. 2.

FIG. 4 shows in greater detail the preferred embodiment of the carrier generator 29. The linear voltage with time unit 32 includes an operational amplifier 49 having inputs on the positive terminal from the potentiometer 38, the terminal 40 of the flip-flop 35 and from a feedback resistor 50. These inputs make the amplifier 49 act as a comparator. The output of the comparator 49 is fed to the negative terminal of an operational amplifier 51 and this amplifier 51 has a feedback capacitor 52 to make it act as an integrator. The output from the integrator 51 will be a negative voltage $e_2$ on the terminal 42 which is the output of the linear voltage with time unit 32 and the input to the voltage to frequency converter 33. This converter applies the incoming signal to an operational amplifier 54 connected as an inverter and also applies the incoming signal through a resistor 55 to an operational amplifier 56 connected as an integrator because of the feedback capacitor 57. The output from the integrator 56 is applied to the carrier magnitude terminal 26 and also through a breakdown diode 58 to an operational amplifier 59 connected as a comparator and through this to a transistor 60. The output of the transistor 60 is fed back to a field effect transistor 62 which acts as a switch connecting the output of the inverter 54 through a resistor 67 to the same negative input terminal of the integrator 56 to which resistor 55 is connected. The resistor 67 has half the resistance of the resistor 55. Conduction of the transistor 60 also controls a buffer amplifier 61 which has an output to both the flip-flops 34 and 35. Such output is directly to the flip-flop 34 and to the flip-flop 35 through a one-shot multivibrator 63 and a NAND gate 64. The flip-flop 34 has two alternate outputs leading through NAND gates 65 and 66, respectively, to the NAND gate 64. One of the alternative outputs from the flip-flop 34 not only leads back to the input in the typical flip-flop configuration but also leads to the carrier polarity terminal 27 to give a signal thereto whenever a signal appears on that flip-flop output.

The carrier generator 29 also may be considered as including the symmetry preserving logic circuit 36 which coacts with the flip-flops 34 and 35 and the aforementioned NAND gates. As part of this logic circuit 36 the reference signal input at terminal 23 is supplied to NAND gate 69, to the NAND gate 65 and also to a one-shot multivibrators 70. The output of the NAND gate 69 is applied to the NAND gate 66 and also to another one-shot multivibrator 71. The outputs of the one-shot multivibrators 70 and 71 are applied to one input of the flip-flop 35.

OPERATION

FIG. 3 illustrates several voltage curves which help in an understanding of the invention. FIG. 3A shows a reference voltage 75 which is shown as a square wave although it may be a sine wave, for example, or it may be made from discrete steps. By way of example this reference voltage may be 33 Hz. and may be produced by the variable frequency source 47. In most inverters this is a variable frequency to variably control the fundamental output frequency at the inverter output leads 17. FIG. 3B shows a synchronizing signal F formed by voltage 76, which is the output from the pulse former 37. In the circuit of FIG. 4, they may be formed by the NAND gate 69 and the one-shot multivibrators 70 and 71. These are voltage pulses formed periodically in accordance with the frequency of the reference voltage 75. In this FIG. 3B they are shown as being formed at the instant when the reference voltage goes to zero and hence a synchronizing interval P is established equal to one-half of the cycle of the reference voltage 75.

FIG. 3E shows the carrier voltage 78 and in this preferred embodiment this carrier voltage is only the positive going half cycles so that it takes two such half cycles to make a complete cycle of the carrier frequency. By way of example this might be 360 Hz. The inverter 11 may be controlled by what is known as subharmonic modulation. The carrier can have the customary form with positive and negative half cycles but it has been found convenient to effectively rectify the carrier, having only positive half cycles, and to generate another signal, the carrier polarity signal on terminal 27, to indicate the polarity of that particular carrier half cycle. Referring to FIG. 2 the linear voltage with time unit 32 has an input voltage $e_1$ which normally is the DC voltage from the potentiometer 38. This is the voltage V shown in FIG. 3C. The other voltage which periodically is present on the input 41 of unit 32 is the voltage on the "one" side of the flip-flop 35. This is the voltage $e_4$ of the flip-flop 35 and is also shown as a square pulse of voltage 77 in FIG. 3C periodically added to the voltage V. The linear voltage with time unit 32 imposes a maximum rate of change or slopes on this summed voltage. This is shown as a negative slope in FIG. 3D because integrator 51 produces a negative voltage. This maximum slope is shown in FIG. 3D which is the voltage $e_2$ on the output 42 of the unit 32. FIG. 3D shows this linearly increasing voltage 79 starting at the instant of time with the synchronizing pulse 76. This linear volts with time unit 32 may be any of a number of commercially available units, such as Reliance Electric Company Part No. 0-490055, which generate a linearly increasing voltage output with a step increase voltage input. The voltage to frequency converter 33 produces a triangular output waveform 78 shown in FIG. 3E. This is of fixed amplitude the frequency of which is proportional to its voltage input, namely the output of the linear voltage with time unit 32. As shown in FIG. 3E throughout most of the cycle of the reference voltage the carrier 78 is a pure triangular wave with a maximum amplitude of E. This is because the frequency is proportional to the fixed DC voltage V from the potentiometer 38. The converter output at terminal 26 thus swings between zero volts and this positive value E and its output is considered to be the absolute value of the desired carrier. The converter 33 also produces a pulse each time it reaches zero, which is the middle of the desired carrier cycle, and these pulses trigger the flip-flop 34 to produce the carrier polarity signal on terminal 27. These pulses also reset the input flip-flop 35.

When a synchronizing pulse 76 appears it sets the input flip-flop 35. This causes a large step increase 77, FIG. 3C, at the input to the linear voltage with time unit 32. The output of the unit 32 then begins to increase at the rates, FIG. 3D. The converter 33 output frequency, as distinguished from its voltage, also increases at rates until the output voltage of the converter reaches zero. The converter 33 then produces a pulse which resets the input flip-flop 35, producing a step decrease at the input to the linear voltage with time unit 32. As seen in FIG. 3C the square wave pulse 77 is terminated at this time. The output of the unit 32 begins to decrease at the rates until it recovers its former value. This is shown in FIG. 3D. At the same time the converter 33 output frequency also decreases at the rates until it returns to its former constant frequency and again achieves a triangular wave.

The converter 33 operates by integrating its input until it reaches a trip voltage E and then integrating back down to zero. This yields an instantaneous frequency proportional to the voltage $e_2$. This integration results in a carrier period reduced by an amount proportional to the square of the correction duration and is hence an exponential function.

FIG. 3I is a representation of the carrier 83 superimposed on the unrectified reference voltage 75. FIG. 3J shows the pulse width modulated voltage 84 which is positive whenever the reference voltage 75 exceeds the carrier 83. From this it will be noted that the waveform 84 does contain the fundamental frequency of the reference voltage 75 and hence a motor connected to the inverter output leads 17 will run at a speed corresponding to this fundamental frequency of the reference voltage.

The symmetry preserving logic circuit 36 includes the gating coacting with the flip-flops 34 and 35 in order to preserve symmetry by resetting the input flip-flop 35 after a positive carrier half cycle when the reference is in a positive half cycle, and after a negative carrier half cycle when the reference is in a negative half cycle.

In the above example of a carrier frequency of 360 Hz. and a reference frequency of 33 Hz., this illustrates a condition wherein the carrier is not an integral multiple of the reference. If there were no synchronizing circuit 30, then the period of the output waveform 84, FIG. 3J, is the smallest time interval that is an integral multiple of both the carrier and reference periods. Because the ratio of 360/33 may be reduced to 120/11 by the factor 3, but this ratio cannot be reduced further, the smallest time interval that is an integral multiple of both the carrier and reference period is one-third second and the period of the output waveform is one-third of a second. By the theory of Fourier Expansion, the output will contain only the fundamental frequency corresponding to this period of one-third second, and integral multiples of that frequency. In the above example this shows that the fundamental frequency can be and is much less than either the carrier or the reference frequencies.

The carrier generator synchronizing circuit 30 of the present invention permits the inverter circuit 11 to be operated in a manner such that the reference frequency is also the fundamental output frequency. In other words the 3 Hz. frequency is eliminated and the 33 Hz. frequency of the reference is the fundamental output frequency. To achieve this it is necessary that the carrier frequency be an integral multiple of the reference frequency. The effect is to cause the carrier to repeat itself during each reference period, enabling the output to do the same. The carrier and reference are then in synchronism. Since the gain of a pulse width modulated system is proportional to the ratio of the reference and carrier amplitudes, it is often necessary to synchronize the carrier without affecting its amplitude. Also, if dissymmetry of the positive relative to the negative half cycle must be avoided, symmetry must be preserved by synchronizing the carrier in such a way that its waveform during the second half of a reference period is the inverse of its waveform during the first half of that period. The present invention of the carrier generator synchronizing circuit 30 generates a carrier which is synchronous with the reference 75, while maintaining constant amplitude and preserving symmetry.

Figure 5:
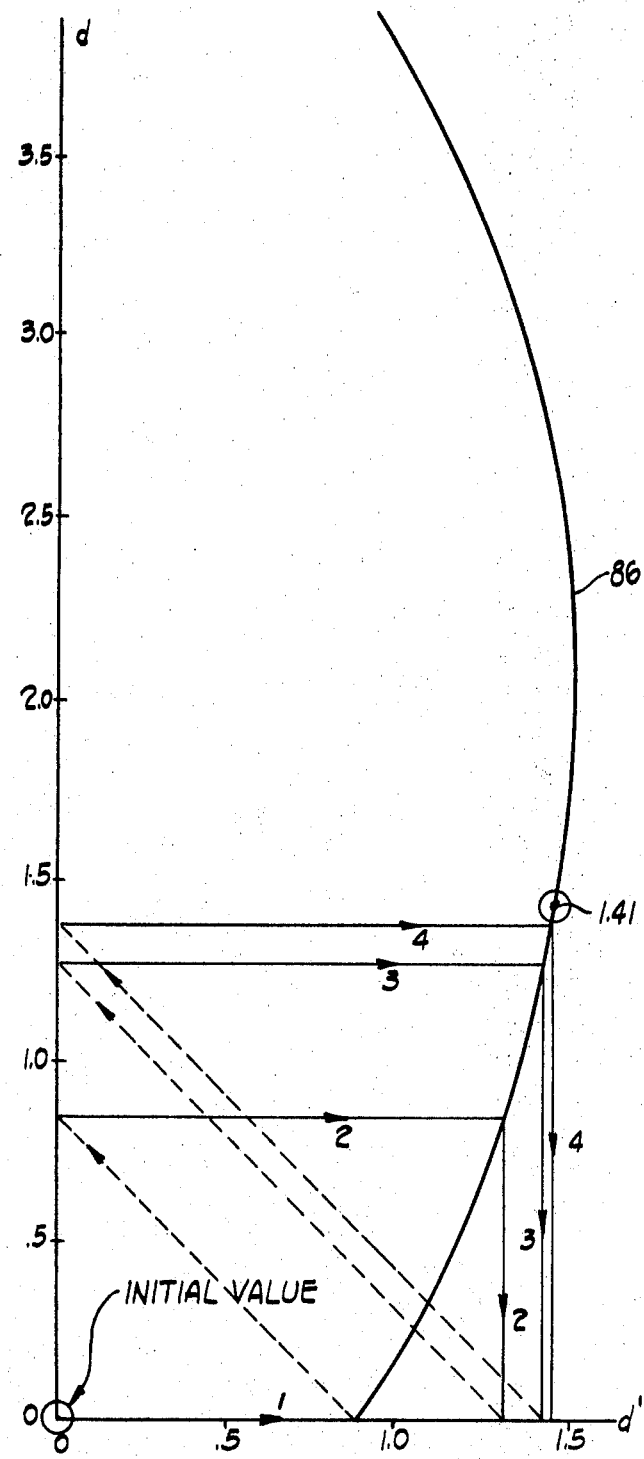
FIG. 5 is a diagram illustrating that the synchronizing circuit is stable.

The present invention provides synchronizing by the application, one or more times each reference cycle, of corrections to a carrier cycle in such a way that the successive corrections tend to converge toward a stable value. In particular, the period $p$ of a carrier cycle is reduced by an amount of time proportional to the square of the time duration of the correction. The duration $d$ of the correction is the time between the appearance of a synchronizing signal and the next zero point of the carrier voltage. The present carrier generator synchronizing circuit 30 is stable as illustrated by FIG. 5 and the following discussion.

ANALYSIS

Definition of variables
$p$    the typical carrier period $P$    the synchronizing interval
$r$    the corrected carrier period, which is shortened in this example.
$d$    the duration of the correction
$N$    the number of carrier cycles per synchronizing interval after correction
$B$    a constant
$T$    a fixed time interval
$(\ )'$ the prime superscript indicates a successive value By assumption, the corrected period is:
(1) $\quad r = p - Bd^2$ Similarly, the next corrected period is:
(2) $\quad r' = p - B(d')^2$ Since $d$ is the time between the appearance of a synchronizing signal and the next zero point of the corrected carrier voltage, that cycle must end $(r/2 + d)$ after the synchronizing signal and begin $(r/2 - d)$ before it. During a synchronizing interval $P$ there is effectively one corrected carrier cycle $r$ and $(N-1)$ typical cycles $p$. Hence adding up the portions comprising the interval $P$:

(3) $\quad r/2 + d + (N-1)p + r'/2 - d' = P$

Substituting
(4) $\quad (p - Bd^2)/2 + d + [p - B(d')^2]/2 - d' = P - (N-1)p$
(5) $\quad d' - d + B/2 [(d')^2 + (d)^2] = Np - P$ Replacing the constant right-hand expression with T:
(6) $\quad d' - d + B/2 [(d')^2 + (d)^2] = T$ Solving for the positive root of $d'$:
(7) $\quad d' = (1/B) [-1 + \sqrt{1 - B(Bd^2 - 2d - 2T)}]$ Differentiating:

8) $\quad \dfrac{\partial d'}{\partial d} = (1 - Bd)/\sqrt{1 - B^2 d^2 + 2Bd + 2BT}$ After the system has stabilized, the successive corrections will be equal. If $d = d'$, equation (6) becomes:
(9) $\quad d = d' = \sqrt{T/B}$ At this point, equation (8) becomes:

10) $\quad \dfrac{\partial d'}{\partial d} = (1 - \sqrt{BT})/(1 + \sqrt{BT})$

If
$$0 < BT < 1, \quad 0 < \dfrac{\partial d'}{\partial d} < 1$$

A recursive series converges if the derivative of the successive value with respect to the present value is positive and less than unity near the limiting value.

As an example, FIG. 5 is a curve 86 showing a partial plot of equation (6) with $B = 1/2$, $T = 1$. For these values, the stable point is $d = d' = \sqrt{2}$. Assume the system has no initial correction ($d = 0$). Following arrow 1, we find that the second correction is $d = .83$. Following arrow 2, the third correction is 1.27. Similarly, the fourth correction is 1.38, and the fifth is 1.41. Further checks show that for any initial correction between zero and four the system converges to within 10 percent of $\sqrt{2}$ in at most three corrections.

In the operation of the carrier generator synchronizing circuit 30 of FIGS. 2 and 4, the circuit satisfies the equation (1) and (2) because the converter 33 operates by integrating its input until it reaches a trip voltage E, and then integrating back to zero, and then repeating. Using the previously introduced symbols one finds that for a typical cycle:

(11) $\quad 4E = \int_0^p V\, dt = Vp$

During a corrected cycle:

(12) $\quad 4E = \int_0^r V\, dt + 2 \int_0^d s t\, dt + Vr + sd^2$

These equations produce:

13) $\quad r = p - \dfrac{s}{V} d^2$

Which agrees with equation 1) if $B = \dfrac{s}{V}$

The above shows that the system is stable and that the corrections are always in the direction toward this stable condition every time there is a change in reference frequency, which establishes a new ratio of carrier to reference frequencies. Putting the wave trains of FIG. 3E on an oscilloscope one observes the carrier magnitude 78 having the constant triangular waves of the normal carrier period $p$ and then periodically during the resynchronizing intervals the compressed waves of higher frequency are observable during the corrected carrier period $r$. In some cases there are two half cycles in the corrected carrier period as shown in FIG. 3E and in other cases there are four half cycles. The reason is that in order to avoid dissymmetry and to have the positive half cycle identical in magnitude at all points to the negative half cycle of the inverter output, one wants a positive going half cycle of the carrier at the beginning of the positive reference half cycle and a negative going carrier half cycle at the beginning of the negative reference half cycle. To achieve this latter condition one needs a positive carrier half cycle at the end of the positive reference half cycle. Together this means that there must be an odd total number of carrier half cycles, both normal and corrected, in a reference half cycle. The logic circuit 36 accommodates this condition to establish either two or four corrected carrier half cycles during the correction period $r$. FIG. 3G shows a voltage $e_5$ which is a pulse appearing on the output 36A of the logic circuit 36 whenever two conditions are satisfied; namely, when the corrected carrier voltage is zero and when an odd number of carrier half cycles have occurred. This gives a signal to the flip-flop 35 to terminate the voltage step 77, FIG. 3C.

The synchronizing signal 76 shown in FIG. 3B need not occur exactly at the point where the reference signal 75 goes to zero. This is merely a convenient place to achieve this synchronizing signal. In fact with a three-phase system and the synchronizing signal being operable on a single one of these phases, then this synchronizing signal will occur at the 60 degree and 240 degree intervals on the second phase and will occur at the 120 degree and 300 degree intervals on the third phase. FIG. 3E shows that the corrected carrier periods $r$ establish periodically a change in the carrier frequency. As shown this is a compression or shortening of the carrier wave which occurs by changing the frequency by changing the correction duration at an exponential rate, in this case an exponent of two, to have a higher and continuously changing frequency during this correction period. The maximum amplitude $E$ of the carrier remains constant as shown in FIG. 3E and this is established by the value of the voltage at which the breakdown diode 58 conducts. Upon such conduction the field effect transistor 62 is turned on and the current flows to the left through the resistor 67. Because this resistor is half the value of resistor 55, the total current supplied to the negative input terminal of the integrator 56 is then caused to reduce along the last half of the triangular pulse as shown in FIG. 3D. Accordingly this results in a decreasing frequency at the output of the converter 33, as shown in the last half cycle of the correction period $r$ of FIG. 3E. By maintaining the maximum amplitude $E$ of the carrier at a constant value and also preserving symmetry between the negative and positive half cycles of the inverter output, this establishes proper operation of any motor energized by the inverter output so that large bursts of current are not supplied to the motor and hence it has smooth operation throughout its variable speed range. Also with the maximum amplitude $E$ of the carrier maintained constant then the gain of the PWM inverter does not change because it is proportional to the ratio of the reference and carrier amplitudes. Further by this synchronization of the carrier and reference voltages then no frequencies lower than the reference are supplied to the motor, such as the 3 Hz. signal in the example above.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

I claim:

1. A synchronizing circuit for two different frequencies, means establishing a carrier frequency signal, means establishing a reference voltage of lower frequency, said reference voltage having a synchronizing interval proportional to the period thereof, there being a plurality of cycles of the carrier frequency in one synchronizing interval and the carrier frequency being other than an integral multiple of the reference voltage frequency, means for synchronizing the carrier and reference voltages once each synchronizing interval including, first means establishing said carrier signal as a train of repetitive cycles and each having a normal carrier period, second means establishing a corrected carrier period of a time interval different from the normal carrier period by a feedback from the phase of a previous carrier period to supply a correction to the frequency of a subsequent corrected carrier period.

2. A synchronizing circuit as set forth in claim 1 wherein said synchronizing circuit is for an inverter to operate an alternating current motor at a varying speed by applying thereto a voltage at a variable frequency proportional to said reference frequency, and said reference frequency being variable to vary the motor speed.

3. A synchronizing circuit as set forth in claim 2 wherein said motor has a substantially constant speed relative to the frequency applied thereto and variable with the variable reference frequency.

4. A synchronizing circuit as set forth in claim 1 wherein the exponent is greater than unity.

5. A synchronizing circuit as set forth in claim 1 wherein said difference between the normal and corrected carrier periods is proportional to the square of the duration of the correction.

6. A synchronizing circuit as set forth in claim 1 wherein said exponent is established by a means to integrate the frequency signal.

7. A synchronizing circuit as set forth in claim 1 wherein the corrected carrier period is established by subtracting a term from the normal carrier period proportional to an exponential function of the error.

8. A synchronizing circuit as set forth in claim 7 wherein the exponential function is proportional to the square of the error.

9. A synchronizing circuit as set forth in claim 1 wherein the synchronizing interval is proportional to one-half the period of the reference voltage and symmetry is preserved.

10. A synchronizing circuit as set forth in claim 1 wherein the carrier frequency is other than an integral multiple of the reference voltage frequency for many different reference frequencies.

11. A synchronizing circuit as set forth in claim 1 wherein said carrier signal is established as a train of repetitive triangular wave cycles at the carrier frequency during the normal carrier periods.

12. A synchronizing circuit as set forth in claim 1 wherein there is a plurality of corrected carrier periods in each synchronizing interval.

13. A synchronizing circuit as set forth in claim 1 wherein the corrected carrier period differs from the normal carrier period by algebraically adding a term thereto proportional to the square of the error.

14. A synchronizing circuit as set forth in claim 1 including means to start the synchronizing interval at each time the reference voltage goes to zero.

15. A synchronizing circuit as set forth in claim 1 wherein said means establishing said carrier frequency signal includes:
   a linear voltage with time unit to establish during the normal carrier periods a constant DC voltage and to establish during the corrected carrier periods a voltage increasing at a given rate; and
   a voltage to frequency converter to establish a repetitive train of triangular wave cycles whose frequency is proportional to the voltage from the linear voltage with time unit.

16. A synchronizing circuit as set forth in claim 15 wherein said converter includes an integrator.

17. A synchronizing circuit as set forth in claim 1, wherein said second means includes a means to vary the carrier voltage with time.

18. A synchronizing circuit as set forth in claim 1, wherein said second means includes a means to vary the carrier voltage exponentially with time.